United States Patent [19]

Nakajima et al.

[11] Patent Number: 6,107,386
[45] Date of Patent: Aug. 22, 2000

[54] FRICTION MATERIALS

[75] Inventors: Osamu Nakajima; Takashi Kudo, both of Saitama, Japan

[73] Assignee: Akebono Brake Industry Co., Ltd., Tokyo, Japan

[21] Appl. No.: 08/391,096

[22] Filed: Feb. 21, 1995

Related U.S. Application Data

[63] Continuation of application No. 08/091,019, Jul. 14, 1993, abandoned.

[30] Foreign Application Priority Data

Jul. 14, 1992 [JP] Japan ................................. 4-209567

[51] Int. Cl.$^7$ ..................................................... C08K 3/00
[52] U.S. Cl. ....................... 524/430; 523/149; 523/152; 523/153; 523/155; 523/156; 523/157; 523/158; 523/159; 524/408
[58] Field of Search ................................. 523/149, 152, 523/153, 155, 156, 157, 158, 159; 524/406, 430

[56] References Cited

U.S. PATENT DOCUMENTS

| | | |
|---|---|---|
| 3,967,037 | 6/1976 | Marzocchi et al. .................... 428/392 |
| 4,226,759 | 10/1980 | Chester . |
| 4,273,699 | 6/1981 | Chester . |
| 4,954,536 | 9/1990 | Komori et al. . |
| 5,258,441 | 11/1993 | Nagahiro et al. ........................ 524/425 |

FOREIGN PATENT DOCUMENTS

| | | |
|---|---|---|
| 0000840 | 2/1979 | European Pat. Off. . |
| 0271965 | 6/1988 | European Pat. Off. . |
| 2535527 | 2/1977 | Germany . |

OTHER PUBLICATIONS

European Search Report, dated Oct. 18, 1993.
Patent Abstracts of Japan, vol. 8, No. 189 (M–321) (1626) Aug. 20, 1984.
Derwent Publication, AN 78–17294A, May 25, 1977.
Derwent Publication, AN 72–57107T.

*Primary Examiner*—Edward J. Cain
*Attorney, Agent, or Firm*—Finnegan, Henderson, Farabow, Garrett & Dunner, L.L.P.

[57] ABSTRACT

A friction material comprising a filler, a binder, and a lubricant, wherein a part or the whole of the filler is constituted by molybdenum trioxide. Not only is the friction material improved in anti-cracking property and anti-fading property under high-temperature and high-load conditions, but the friction material can be prevented from deterioration due to ashing.

2 Claims, No Drawings

FRICTION MATERIALS

This application is a continuation of application Ser. No. 08/091,019, filed Jul. 14, 1993, now abandoned.

BACKGROUND OF THE INVENTION

1. Field of the Invention

The present invention relates to friction materials to be used in brakes, clutches, and the like, for cars and industrial machines.

2. Description of the Related Art

Friction materials of the type comprising a fibrous reinforcement, an inorganic filler, a friction modifier, and a binder, as disclosed in U.S. Pat. No. 4,226,759 and U.S. Pat. No. 4,273,699, for example, are generally limited in use because the conventional friction materials have a tendency to develop cracks or to deteriorate due to ashing when used under high-temperature and high-load conditions. There is a further tendency for a problem that the friction coefficient is lowered at the time of frictional braking (fading phenomenon) because of decomposed gas generated from the binder and organic dust of the friction modifier contained in the friction material.

SUMMARY OF THE INVENTION

The present invention provides a friction material excellent in prevention of fading due to friction coefficient lowering, development of cracks and deterioration due to ashing. According to the present invention, friction material comprising a fibrous reinforcement, an inorganic filler, a friction modifier, and a binder, is characterized in that the friction material contains molybdenum trioxide in the filler. Lowering of friction coefficient, generation of cracks and deterioration due to ashing can be prevented by mixing molybdenum trioxide in the friction material even in applications where the friction material is used under high-temperature and high-load conditions. If the molybdenum trioxide content is less than 0.5%, the effect is not sufficient to the intended friction material characteristics. As the molybdenum trioxide content increases to 15% from 0.5%, the effect increases in accordance with the content. If the molybdenum trioxide content is more than 15%, the effect does not increase further. Accordingly, the molybdenum trioxide content is preferably selected to be in a range of from 0.5% to 15%.

Additional features and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF THE PREFERRED EMBODIMENT

To produce a friction material of the present invention, for example, a mixed and stirred compounding raw materials containing molybdenum trioxide, as shown in Table 1, is preformed under surface pressure in a range of from 100 to 500 kgf/cm$^2$, the preformed material is introduced into a hot press having a pressure plate set therein, and subjected to thermal forming at a temperature in a range of from 130 to 180° C. under surface pressure in a range of from 200 to 1000 kgf/cm$^2$ for a time period in a range of from 3 to 15 minutes, thereby to finish up a material having a predetermined thickness and a predetermined density. Then, the finished material is subjected to heat treatment at a temperature in a range of from 150 to 300° C. for a time period in a range of from 1 to 15 hours. Then shaping treatment is performed to obtain a desired brake pad.

TABLE 1

| | Raw Materials | Mixture Weight Proportion |
|---|---|---|
| Fibrous Reinforcement | Aramid fiber such as KEVLAR, etc., inorganic fiber such as ceramic fiber, rock wool, etc., metallic fiber such as steel fiber, copper fiber, brass fiber, etc. | 2–70 |
| Inorganic Filler | Metal oxide such as alumina, silica, etc., solid lubricant such as graphite, molybdenum disulfide, etc., and barium sulfate. | 6–70 |
| | Molybdenum trioxide | 0.5–15 |
| Friction Modifier | Metal particles such as copper particles, brass particles, etc. | 0.5–10 |
| | Organic dust such as rubber dust, cashew dust, etc., and inorganic matter such as vermiculite, etc. | 1–15 |
| Binder | Thermosetting resin such as phenolic resin, etc. | 5–15 |

Illustrative examples of the present invention will be described below.

Raw materials for friction materials having compositions shown in Table 2 were treated in accordance with the above-mentioned production procedure to prepare friction materials 1 and 2 of the present invention and a comparative friction material.

TABLE 2

| | Mixture Weight Proportion | | |
|---|---|---|---|
| Raw Material | Friction Material 1 of the Invention | Friction Material 2 of the Invention | Comparative Friction Material |
| KEVLAR (E. I. Du-Pont) | 5 | 5 | 5 |
| copper fiber | 13 | 13 | 13 |
| ceramic fiber | 15 | 15 | 15 |
| ceramic particles | 5 | 5 | 5 |
| graphite | 10 | 10 | 10 |
| barium sulfate | 28 | 25 | 30 |
| molybdenum trioxide | 2 | 5 | — |
| copper particles | 2 | 2 | 2 |
| rubber particles | 5 | 5 | 5 |
| cashew dust | 5 | 5 | 5 |
| phenolic resin | 10 | 10 | 10 |

These friction materials were subjected to evaluation test by using a full-size dynamometer. The sizes of test articles used therein were selected as follows: pressure plate of 5 mm thickness; friction material of 10 mm thickness; and friction area of 45 cm$^2$. Conditions of bench test were selected as follows: JASO fading test: speed 100 km/hr→0 km/hr, deceleration 0.45 G, braking interval 35 sec×10 times; disc rotor: ventilated disc rotor with a thickness of 18 mm, a rotor radius of 0.100 m and a tire radius of 0.280 m. Results of the test were as shown in Table 3.

TABLE 3

| Item | Friction Material 1 of the Invention | Friction Material 2 of the Invention | Comparative Friction Material |
| --- | --- | --- | --- |
| Fading Minimum $\mu$ | 0.150 | 0.180 | 0.130 |
| Cracking | Δ | ○ | x |
| Ashing deterioration | ○ | ○ | x |

In the above table, "fading minimum $\mu$ represents the minimum friction coefficient in the fading test (10 braking times). In the above table, the symbol ○ indicates that there is no problem with cracking or ashing deterioration, the symbol Δ indicates that these characteristics respectively are in an allowable range, and the symbol x indicates the existence of a problem.

As shown in the above table, not only are the friction materials of the present invention both higher in the minimum friction coefficient than the comparative friction material, but also, the friction materials of the present invention are in an allowable range for generation of cracks and further, are free from deterioration due to ashing.

As described above, according to the present invention, there are remarkable effects in improved anti-cracking properties of the friction material under high-temperature and high-load conditions, improved prevention of deterioration due to ashing, and improved anti-fading properties due to reduction of gas generation from components of the friction material.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A friction material comprising a fibrous reinforcement, an inorganic filler, a friction modifier, and an organic thermosetting resin binder, wherein said inorganic filler contains molybdenum trioxide.

2. A friction material according to claim 1, the total mixture amount of said friction material contains 0.5 to 15% by weight of molybdenum trioxide.

\* \* \* \* \*